UNITED STATES PATENT OFFICE.

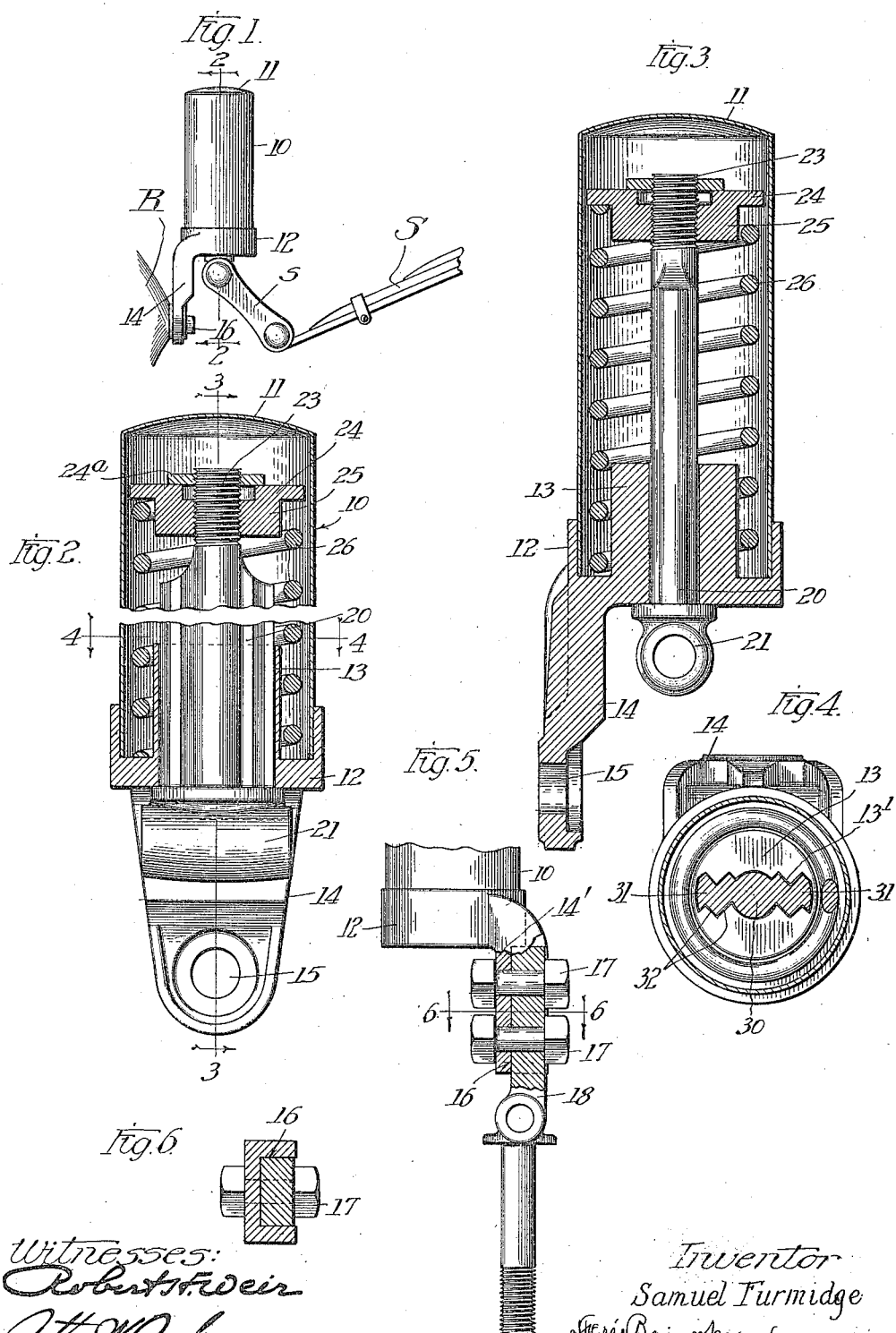
S. FURMIDGE.
AUTOMOBILE SHOCK ABSORBER.
APPLICATION FILED JAN. 22, 1915.
1,158,402.
Patented Oct. 26, 1915.
2 SHEETS—SHEET 1.
Witnesses:
Robert F. Weir
Arthur W. Carson
Inventor
Samuel Furmidge
Bree Bain & Mann, attys.

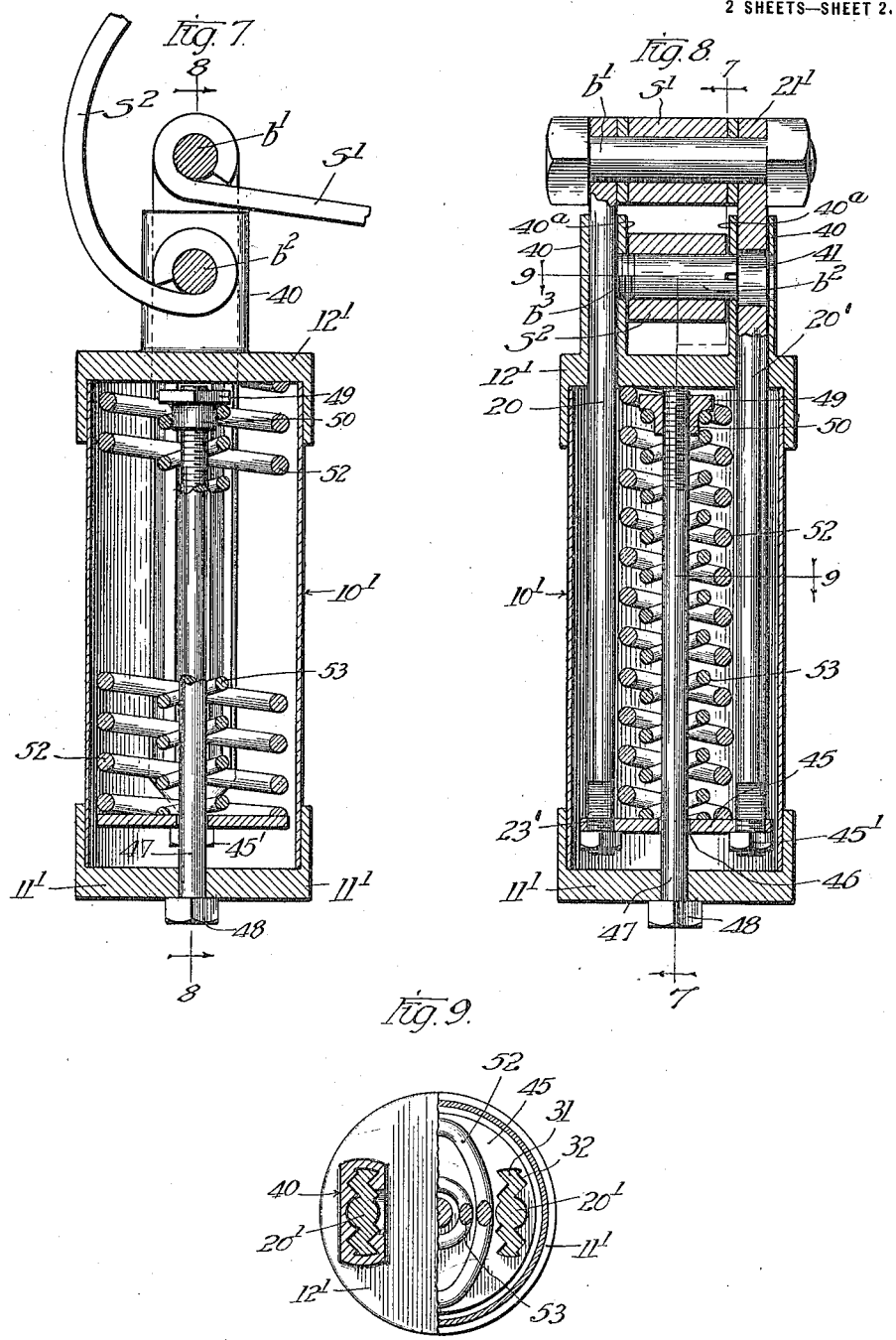

SAMUEL FURMIDGE, OF CHICAGO, ILLINOIS, ASSIGNOR, BY DIRECT AND MESNE ASSIGNMENTS, TO AUTO DEVICE MANUFACTURING COMPANY, A CORPORATION OF WISCONSIN.

AUTOMOBILE SHOCK-ABSORBER.

1,158,402. Specification of Letters Patent. Patented Oct. 26, 1915.

Application filed January 22, 1915. Serial No. 3,671.

*To all whom it may concern:*

Be it known that I, SAMUEL FURMIDGE, a citizen of the United States, residing at Chicago, in the county of Cook and State of Illinois, have invented certain new and useful Improvements in Automobile Shock-Absorbers, of which the following is a specification.

My invention relates to automobile shock absorbers, and more particularly, in some of its features, to shock absorbers of the type adapted for connection in the main spring-system of the automobile to act in tandem, or in series, so to speak, with the main springs that effect resilient connection between the running gear and body.

One of the salient objects of my invention is to provide a shock absorber which will be highly resistant to wear, and will effectively prevent transverse swing between parts to which the device is connected.

A further object of my invention is to provide a construction which will be simple, cheap, effective and easy of manufacture, installation and repair.

In the drawings wherein embodiments of my invention are illustrated Figures 1 to 6 illustrate a construction embodying features of my invention and particularly suitable for installation in automobiles of the "Ford" type that employ at each end of the body, a single semi-elliptic platform spring for connection to the running gear, so giving a quarter-elliptic spring at each point of support. Figs. 7 to 9 illustrate a structure embodying features of my invention adapted for installation in connection with two spring members, in place of the shackle ordinarily employed to connect the spring-ends. In said drawings Fig. 1 is a small elevation of a fragment of a rear spring arrangement of the Ford type, showing application of my shock absorber. Fig. 2 is a vertical section on line 2—2 of Fig. 1; Fig. 3 is a vertical section on line 3—3 of Fig. 2; Fig. 4 is a transverse section on line 4—4 of Fig. 2; Fig. 5 is an enlarged detail showing a bracket arrangement suitable for use in connection with the front axle of a Ford car, and Fig. 6 is a section on line 6—6 of Fig. 5. Fig. 7 is a vertical section on line 7—7 of Fig. 8; Fig. 8 is a vertical section on line 8—8 of Fig. 7; and Fig. 9 is a horizontal section on the broken line 9—9 of Fig. 8.

In Figs. 1 to 6, 10 indicates a cylindrical casing member that has, preferably, an integral end 11 at one extremity and that is seated at its other extremity in a head 12. Said head 12 has a relatively deep guiding extension, or boss 13, preferably extending into the casing and exteriorly said head has an extension 14 suitably constructed to facilitate connection of the head with the running gear member of the car. For devices applicable to the rear of a car of the Ford type, said extension 14 is offset at one side of the head and has an aperture 15 to receive a bolt 16 connecting it to a running gear part such as the brake-housing R (Fig. 1) while for installation at the front end of such type of car the extension 14′ (Fig. 5), similarly offset, is recessed as at 16 and bolted or riveted as at 17 to a bracket fitting 18 that is suitably constructed for connection with the front axle, preferably as a substitute for the spring connection normally found there.

For connection with the shackle *s* of the quarter-elliptic spring S of such Ford-type car I provide a slide member 20 that has a transverse head 21 suitably apertured for pivotal connection with the shackle *s*. This slide-member 20 extends guidedly through the bearing 13 of the casing head 12 and at its extremity within the casing preferably provides a cylinder portion 23 threaded suitably to receive a threaded bearing plate 24 having a central boss 25, the annular rim of said plate affording bearing for the single coil spring 26, the opposite end of which surrounds the bearing projection 13 of the head 12 and bears against said head. A lock nut 24ª may be employed to fix the position of plate 24. Obviously, by this general construction, shock-absorber spring 26 acts in tandem with vehicle spring S, and the flexible connection afforded by the shackle *s* enables the spring S to elongate as need be without disturbing the relation of the shock absorbing casing to the running gear.

In the shock absorber construction, however, the bearing that is provided between the casing head and the slide member that passes therethrough is primarily relied on for resistance to side-swing of the vehicle body, and under the constantly changing conditions of operation and varying thrusts communicated through shackle *s*, the guided, spring-surrounded slide-member constantly grinds against the guiding surfaces of the head. A serious defect in shock absorbers, that are dependent upon such a sliding connection between the head and a guided slide structure, is a very rapid wear that takes place, rapidly leading to looseness, inadequacy of guidance, insufficiency of the resistance to side swing, and noisiness in operation.

In the embodiment of my invention I employ wide slide members that afford bearing surfaces, at their side-swing-resisting sides, greatly in excess of the area of a mere side-elevation of the surface. To this end I form the slide-member with such surfaces indented or corrugated, and the coacting surfaces of the guiding head I correspondingly indent or corrugate to interfit therewith.

In the particular construction shown the slide member 20 comprises, in an integral structure, a central post portion 30, preferably forming, at its exposed surfaces, substantially a continuation of the cylindrical end portion 23, and flanking side wings 31 preferably relatively broad and thin, each of said wings 31 being corrugated or indented to provide a number of angularly disposed bearing surfaces 32, and the construction preferably alining an indentation on one side of a wing with a crest or apex on the other side of the wing, so that the material of each wing is substantially uniform in thickness, as best indicated in Fig. 4.

The guide opening 13' in the elongated bearing part 13 is similarly shaped, so that very large effective wear-resisting surfaces are provided between the two elements without unduly increasing the size or weight of the slide. Furthermore, it will be observed that the corrugated formation of the slide member gives it very great strength laterally or in the direction of its least dimension, and also increases very greatly the surface exposure to oppose edge-wise wear of the slide, so that the structure will resist wear due to any tendency to fore-and-aft swing between the vehicle parts.

In the construction shown in Figs. 7 to 9, the salient features of the invention above described are embodied in modified structural form in a shock absorber that has an easily-adjustable spring tension and that is adapted for suspension between two vehicle spring members $S^1$ and $S^2$. In that construction, cylinder 10' preferably has an end casting 11' fitting as a lower head on the casing and its upper head 12' has two extension members 40 that preferably extend outwardly from the head, thereby to be available for both supporting and guiding functions. Each of these extensions 40 guides a corresponding slide member 20' that, in general construction, as to the corrugated nature of its guiding surfaces, its central post formation and the like, is similar to the slide structure heretofore described. At their upper extremities these slides have flattened portions 21' to receive a bolt $b'$ to which the running-gear connected spring-member $S'$ may be attached, while a bolt or screw $b^2$ between the extensions 40 serves to receive the eye of body-connected main-spring-member $S^2$. I prefer that the screw $b^2$ shall be carried by the inner confronting walls $40^a$ of the extensions 40, only, and to this end I preferably thread one extremity of the screw as at $b^3$ and the corresponding aperture in wall $40^a$ of one extension, while through both walls of the other extension I make plain apertures, and in the corresponding slide member 20' I make an aperture 41 through which the screw may be passed, so as to find its ultimate position that is indicated in the drawings.

At their lower ends the threaded cylindrical extensions 23' of the slides carry a transverse spring-receiving plate 45 that is retained in place by nuts 45'. Plate 45 also has an aperture 46 that loosely surrounds a long bolt 47, the head 48 of which is outside of the cap 11', and the threaded extremity of which preferably extends almost to the head 12'. This bolt carries an adjustable nut 49 having a centering boss 50 to act as a spring abutment. The spring or springs employed in such a construction will be interposed between the plate 45 on the one hand and parts positioned by the casing, on the other hand. Specifically I prefer to employ two parallel springs, one being a large spring, 52, made of elliptical contour, fitting between the guide members 20' and extending between points of contact with the plate 45 and the head 12' and the other being a lighter spring, 53, within the first, surrounding the bolt 47, and finding its opposite bearings on the plate 45 and against the adjustable nut 49.

In this construction the spring tension of the shock absorber may readily be adjusted by turning the bolt-head 48, thereby raising or lowering the nut 49 and varying the tension of the inner spring 53.

While I have herein described in some detail a particular embodiment of my invention, for purposes of full disclosure thereof it will be apparent to those skilled in the art that many changes in detail might be made without departure from the spirit of the invention and within the scope of the appended claims.

Having described my invention, what I claim is:—

1. A shock absorber comprising an apertured head having means for attachment to an automobile part, a slide working through said head, having means for attachment to another automobile part, and resilient means interposed between said slide and head, the said slide having corrugated surfaces, and said head having a guide opening shaped to interfit with the corrugations.

2. A shock absorber comprising an apertured head having means for attachment to an automobile part, a slide working through said head, having means for attachment to another automobile part, and resilient means interposed between said slide and head, said slide being relatively broad and thin, having its broad surfaces corrugated, and said head having a guide opening constructed to interfit therewith.

3. A shock absorber comprising an apertured head having means for attachment to an automobile part, a slide working through said head, having means for attachment to another automobile part, and resilient means interposed between said slide and head, said slide having a rounded central portion terminating at its lower end in a threaded portion and having, above said threaded portion, corrugated wings flanking the central portion, and said head having an opening therein of shape to interfit with a cross-section of the slide member.

4. In a shock absorber, the combination of a casing providing a head having an elongated bearing extension provided with an opening surrounded on all sides by the material of said extension, a slide member extending through said opening into the casing, a bearing member carried by the end portion of said slide member and a spring interposed for bearing between a casing-positioned part and said bearing member, said slide having its side faces composed of a plurality of longitudinal surfaces alternately disposed at opposite angles to the plane of the slide, and the sides of said opening in the head conforming to said surfaces, thereby effecting extensive bearing between the head and slide and preventing displacement of the slide in any save in longitudinal direction.

In testimony whereof I hereunto set my hand in the presence of two subscribing witnesses.

SAMUEL FURMIDGE.

In the presence of—
STANLEY W. COOK,
MARY F. ALLEN.

Copies of this patent may be obtained for five cents each, by addressing the "Commissioner of Patents, Washington, D. C."